Figure 1:
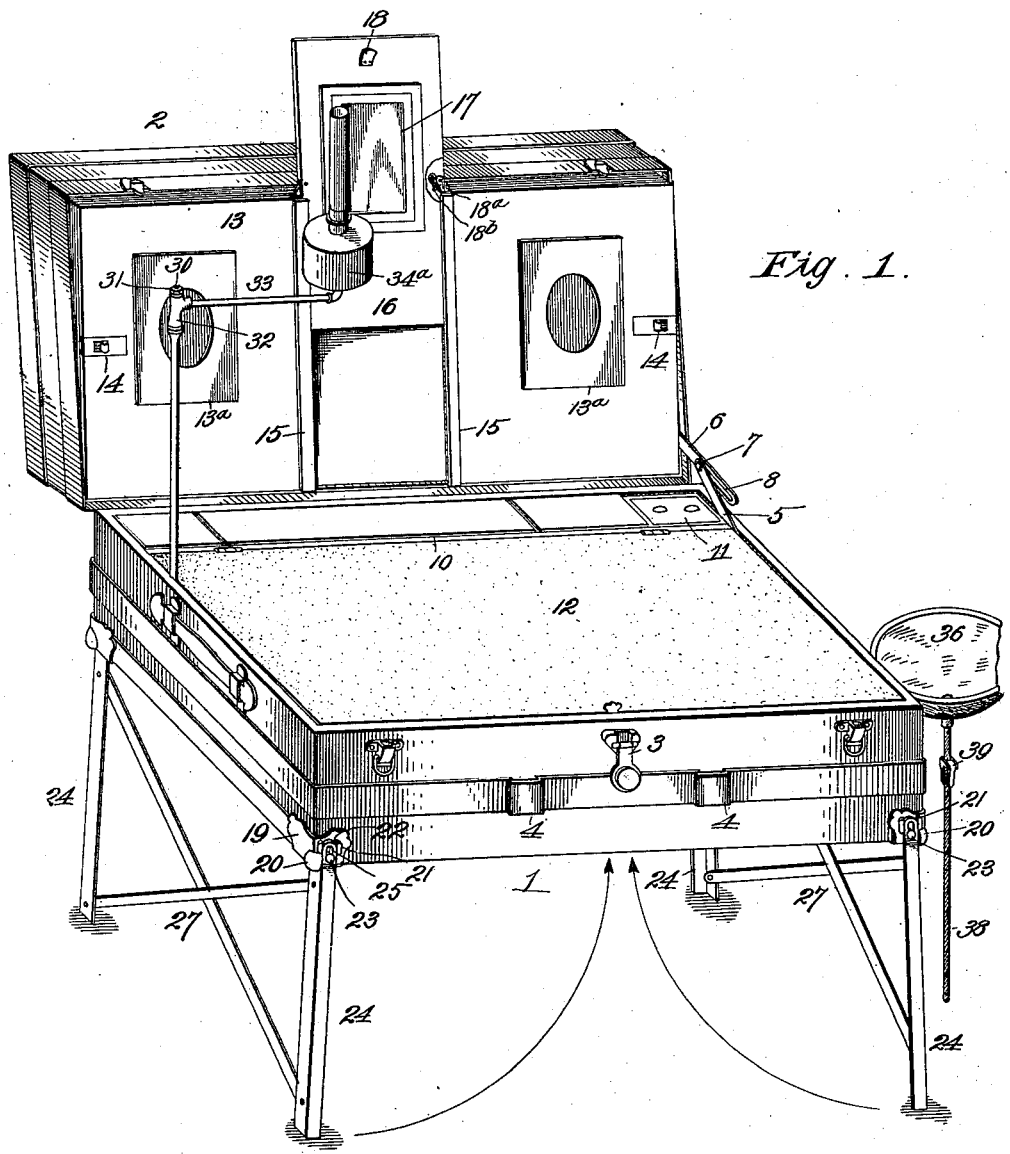

No. 661,194. Patented Nov. 6, 1900.
A. P. ROTHSCHILD & G. J. BUB.
TABLE DESK TRUNK.
(Application filed Apr. 24, 1900.)

(No Model.) 2 Sheets—Sheet 1.

Witnesses:
H. C. Rodgers
W. R. Kirk

Inventors:
A. P. Rothschild
and G. J. Bub
By Fischer & Thorpe
Atty's

No. 661,194. Patented Nov. 6, 1900.
A. P. ROTHSCHILD & G. J. BUB.
TABLE DESK TRUNK.
(Application filed Apr. 24, 1900.)
(No Model.) 2 Sheets—Sheet 2.
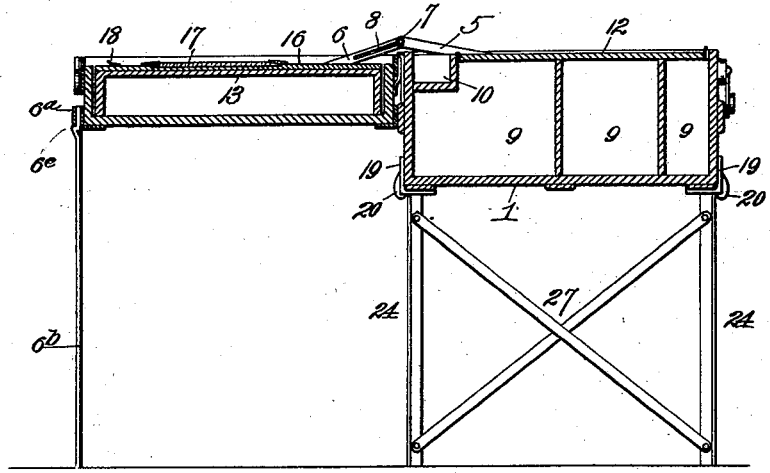
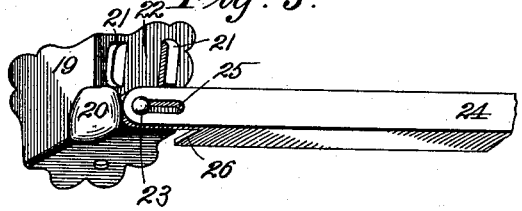
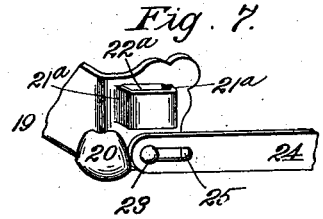
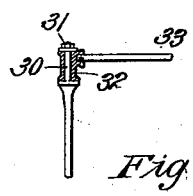
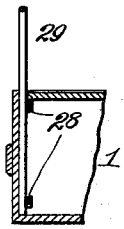
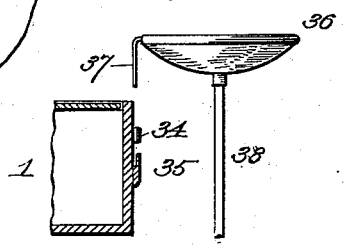
Witnesses:
H. C. Rodgers.
W. R. Kirk.
Inventors:
A. P. Rothschild
and G. J. Bub
By Fischer & Thorpe
attys.
THE NORRIS PETERS CO., PHOTO-LITHO., WASHINGTON, D. C.

UNITED STATES PATENT OFFICE.

ALFRED P. ROTHSCHILD AND GEORGE J. BUB, OF LEAVENWORTH, KANSAS.

TABLE-DESK TRUNK.

SPECIFICATION forming part of Letters Patent No. 661,194, dated November 6, 1900.

Application filed April 24, 1900. Serial No. 14,111. (No model.)

*To all whom it may concern:*

Be it known that we, ALFRED P. ROTHSCHILD and GEORGE J. BUB, citizens of the United States, and residents of Leavenworth, Leavenworth county, Kansas, have invented a new and useful Table-Desk Trunk, of which the following is a specification.

Our invention relates to table-desk trunks, and more particularly to a trunk designed especially for travelers, army and navy officers, &c., and susceptible of convenient use for various purposes—as a trunk or portable receptacle, a desk, a card-table, or a dresser with illuminating and lavatory attachments.

Our object is to produce a table-desk trunk of the type above outlined provided with folding legs to economize space, and which protect the trunk from injury at certain points while in shipment, and which combines simplicity, strength, durability, and cheapness of construction.

With this object in view the invention consists in certain novel and peculiar features of construction and combinations of parts, as will be hereinafter described and claimed.

In order that the invention may be fully understood, reference is to be had to the accompanying drawings, in which—

Figure 1 is a perspective view of the device as arranged for use as a dresser or writing-desk. Fig. 2 is a vertical cross-section as arranged for use as a card-table. Fig. 3 is a detail perspective view, enlarged, of one of the bumper-brackets and the hinged leg secured thereto and occupying its folded position. Fig. 4 is a vertical section showing the standard on which the illuminating attachment is swiveled. Fig. 5 is a vertical section showing the ink-well receptacle. Fig. 6 is a detail section showing one end of the device with the lavatory attachment detached. Fig. 7 is a detail perspective view of a modified form of leg construction with the leg folded.

In the said drawings, where like reference-numerals refer to corresponding parts, 1 designates the body of an ordinary shallow trunk of the type known as "steamer-trunks," 2 the hinged top, and 3 the lock for securing the top in its closed position. At opposite sides of the lock the trunk is provided, as usual, with a pair of guide-loops 4 for a pair of straps. (Not shown.)

Connecting the body portion and top of the trunk are the folding parts 5 and 6, pivoted together, as shown at 7, the arrangement being such that ordinarily the top will be prevented from moving farther back than as shown in Fig. 1. As it is desirable at times to swing the top back to a horizontal position to provide a table for amusement or other purposes, the part 6 is provided with an elongated slot 8 to permit the pivot 7 when loosened to slide to the forward end of the part 6, where it is again tightened. To assist the parts 5 and 6 in supporting the top in its horizontal opened position, a loop $6^a$ is provided at the center of its front side, and detachably engaging said loop is the upper end of a temporary leg $6^b$, having a shoulder $6^c$, upon which the loop rests. It is desirable, of course, in using the device as a table that a table cover or cloth be spread over it in order to cover up cracks and joints, thus rendering the surface as smooth as possible. When the device is not in use as a table, said leg $6^b$ is placed in one of the compartments 9 of the trunk-body.

In the upper rear edge of the trunk is provided a shallow compartment 10, at one end partitioned to provide an ink-well receptacle 11. Compartments 9 are closed by the hinged lid 12, preferably cloth-covered, to provide a smooth writing-surface when the device is in use as a desk.

The top of the trunk contains a tray 13, secured in place by the guides 14 in the customary manner. At its inner side it is provided with parallel cleats 15, forming grooves to receive the sliding frame 16, having a mirror 17 and a handle 18 by which it may be manipulated. It is also provided with a pair of dogs $18^a$, pressed outward by springs $18^b$ as soon as the tops of the cleats are reached, so as to support the mirror-frame in its elevated position when it is desired to use the device as a dresser. For purposes of ornamentation and convenience picture-frames $13^a$ are secured to the under side of the top at opposite sides of the mirror-frame.

19 designates corner-brackets secured to the lower corners of the trunk and provided with projections or bumpers 20 to protect the trunk from injury by careless handling. The arms of the brackets embracing the front and rear sides of the trunk are provided with outwardly-projecting lugs 21, extending slightly downward and outward and providing a pocket 22 between them, and centrally of and below said pockets are bolts or pins 23, secured to the trunk in any suitable manner.

24 designates legs, by preference of angle-iron. The front sides of the front legs and the rear sides of the rear legs are prolonged at their upper ends, so as to form shoulders 26, adapted to bear against the under side of the trunk and support it. The prolonged ends bear against the base of the trunk and are provided with slots 25, engaging the necks of said bolts. When the legs are supporting the trunk — namely, when the latter is used as a desk, dresser, or table—the shoulders 26, as above stated, bear against the under side of the corner-brackets, and the prolonged slotted ends fit in the pockets 22 between lugs 21, with the bolts occupying the lower ends of said slots. (See Fig. 1.) In this position it is obvious that the legs are held absolutely rigid. When it is desired to fold the legs to the position for shipment, as indicated by the arrows, Fig. 1, the trunk is lifted slightly to permit the legs by gravity to slide down until the upper ends of the slots engage bolts 23 and their prolonged ends are withdrawn from said pockets. The persons manipulating the trunk can now swing the legs inward and upward until they embrace and reinforce the lower edges of the trunk at its front side, rear side, and bottom, and in such position they are adapted to be secured by straps (not shown) encircling the trunk at opposite sides of the lock and extending through the guide-loops 4, hereinbefore described, to prevent slippage.

To add additional rigidity to the hinged-leg construction it is desirable to brace the legs of the corresponding ends of the trunk together, which we accomplish by a pivoted cross-brace 27. With this cross-brace it is also easier to effect the folding of the legs, as will be readily understood.

For convenient use of the device as a desk or dresser in the evening it is provided at one end and preferably at its inner side with clips 28 and with a removable standard 29, adapted to fit in said clips, as shown in Fig. 4, and when not in use to be stored in one of the compartments 9. At its upper end it is reduced to form the pivot-stem 30, and swiveled upon said stem and held reliably in such position by a retaining-nut 31, engaging the upper end of the stem, is a coupling 32, provided with a horizontal arm 33, carrying a lamp 34ᵃ, which may be swung to a position above or to one side of the desk or dresser. When the lamp is not in use, the globe, burner, and wick are removed and a cork or cap (not shown) employed to close the opening in the tank to prevent the escape of the oil. The lamp and attachments in this condition can be conveniently stored in one of the compartments 9.

Secured externally to one end of the trunk-body is a loop 34 and the upwardly-disposed hook 35. A lavatory attachment in the shape of a rubber washbasin 36, by preference, is provided, with a depending metallic arm 37, adapted to extend through loop 34 and engage and rest upon the bottom of said hook. To drain the water from the basin 36 it is provided with a drain-pipe 38, having a controlling-valve 39 of the type shown or any other suitable or preferred type. When not in use, the lavatory attachment can be folded into a compact package and placed in a compartment 9 of the trunk.

By Fig. 7 is shown a slightly-modified construction of corner-bracket. This bracket is constructed of sheet metal. The parts 21ᵃ correspond to lugs 21 and are formed by stamping a loop forwardly from the body of the plate, the ends of said loop corresponding to lugs 21 and the passage of the loop to the pocket 22. This construction is on precisely the same principle as that shown in Fig. 3.

From the above description it will be apparent that we have produced a table-desk trunk embodying the features of advantage enumerated as desirable in the statement of invention, and it is to be understood that, while we have illustrated and described the preferred embodiment of the invention, there may be various changes made in the form, proportion, detail construction, and arrangement of the parts without departing from the essential spirit and scope or sacrificing any of the advantages of the appended claims.

Having thus described the invention, what we claim as new, and desire to secure by Letters Patent, is—

1. In a device of the character described, a set of corner-brackets having pivot-pins and pockets above said pins, and legs having slots pivotally embracing said pins and adapted to fit in said pockets, substantially as described.

2. In a device of the character described, a set of corner-brackets having pivot-pins and pockets above said pins, and legs at corresponding ends connected in pairs and all provided with slotted upper ends engaging said pins and adapted at times to fit in said pockets, substantially as described.

3. In a device of the character described, a set of corner-brackets having pivot-pins and pockets above said pins, and legs constructed of angle-iron, each leg having one arm prolonged beyond the other to provide a shoulder at the upper end of the latter; said prolonged arms having longitudinal slots and adapted at times to fit in said pockets, substantially as described.

4. In a device of the character described, a set of corner-brackets having pivot-pins and pockets above said pins, and legs constructed of angle-iron, each leg having one arm prolonged beyond the other to provide a shoulder at the upper end of the latter; said prolonged arms having longitudinal slots and adapted at times to fit in said pockets, and said legs being adapted to be clamped firmly up against the lower front and rear edges of the trunk, substantially as described.

5. In a device of the character described, a body portion supported upon legs, a top hinged to the body portion, means to support the top in a substantially vertical position, a tray in said top, guide-cleats secured to the bottom of the tray, a sliding mirror secured in said guide-cleats, means to support it in its elevated position, an illuminating attachment supported upon the body portion, and a lavatory attachment detachably connected to the body portion, all arranged substantially as and for the purpose set forth.

In testimony whereof we affix our signatures in the presence of two witnesses.

ALFRED P. ROTHSCHILD.
GEORGE J. BUB.

Witnesses:
EDWARD T. HAUG,
FRANK B. AARON.